May 24, 1932.　　　A. L. HESTON　　　1,860,342
TELESCOPIC TIRE BUILDING DRUM
Filed Aug. 9, 1929　　　5 Sheets-Sheet 1

INVENTOR
ALLEN L. HESTON.
BY
ATTORNEYS.

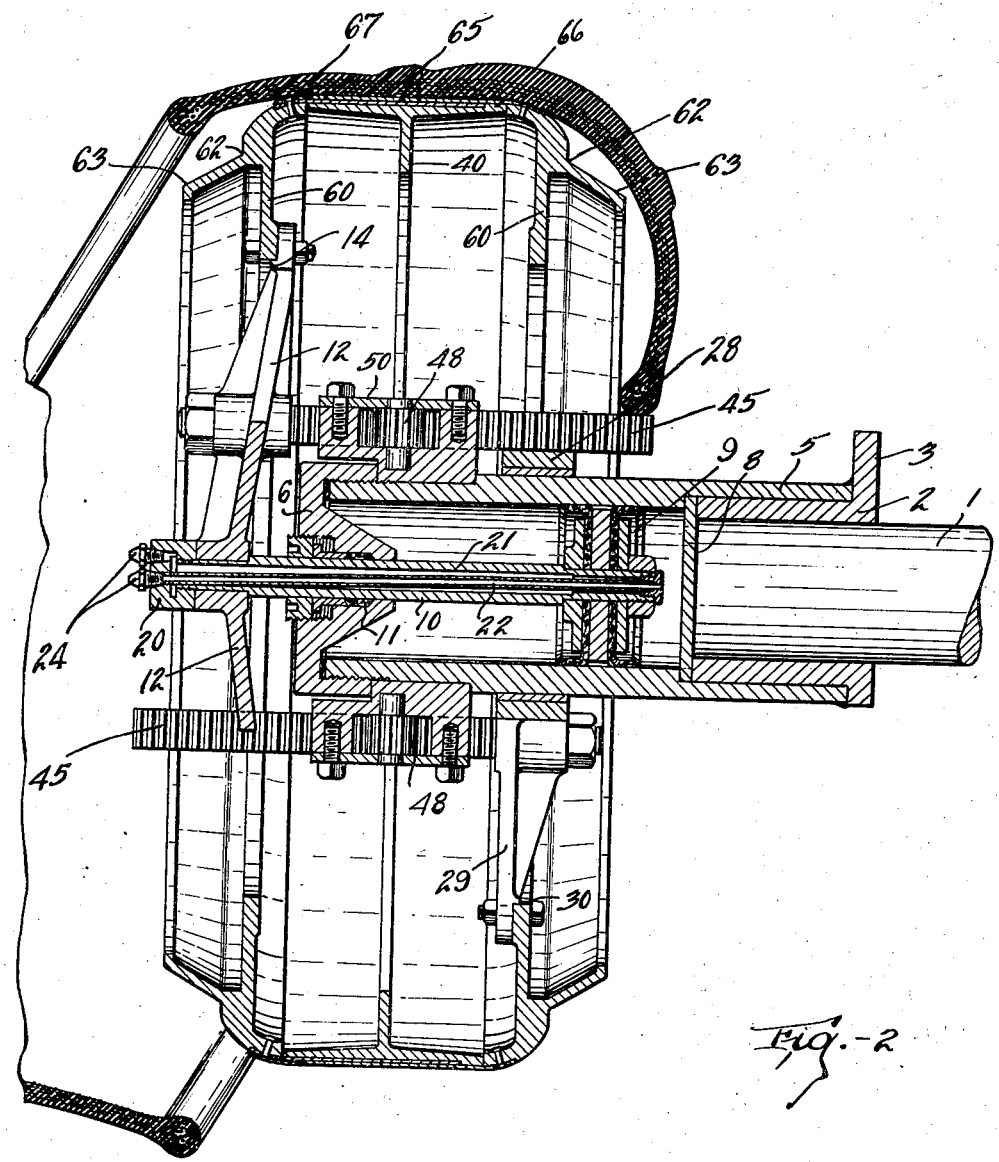

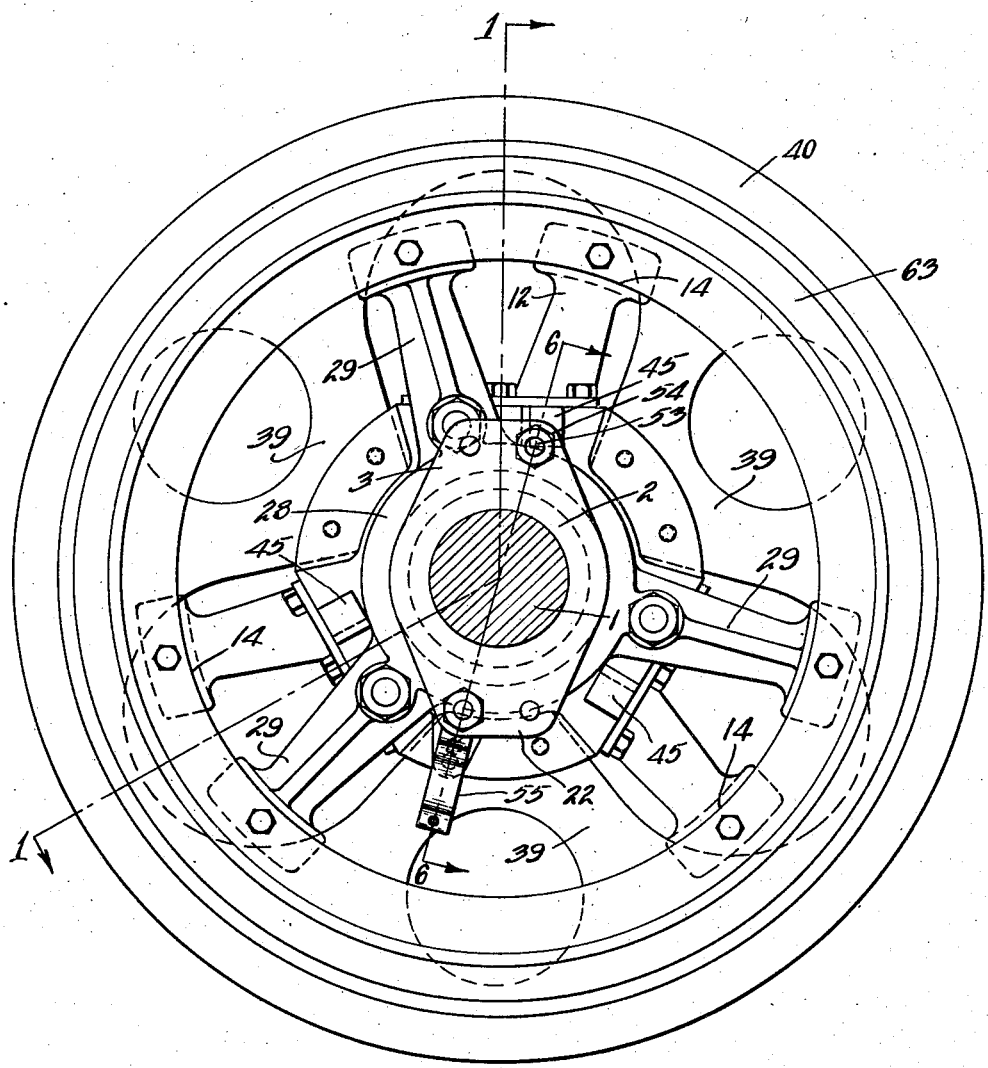

May 24, 1932.  A. L. HESTON  1,860,342
TELESCOPIC TIRE BUILDING DRUM
Filed Aug. 9, 1929  5 Sheets-Sheet 4

INVENTOR
ALLEN L. HESTON.
BY
Ely + Barrows
ATTORNEYS

May 24, 1932.  A. L. HESTON  1,860,342
TELESCOPIC TIRE BUILDING DRUM
Filed Aug. 9, 1929  5 Sheets-Sheet 5

INVENTOR
ALLEN L. HESTON.
BY
ATTORNEYS

Patented May 24, 1932

1,860,342

UNITED STATES PATENT OFFICE

ALLEN L. HESTON, OF COLUMBIANA, OHIO, ASSIGNOR TO THE NATIONAL RUBBER MACHINERY COMPANY, OF AKRON, OHIO, A CORPORATION OF OHIO

TELESCOPIC TIRE BUILDING DRUM

Application filed August 9, 1929. Serial No. 384,683.

The invention is a continuation in part of my copending application for Telescopic tire building drum, Serial No. 378,934, filed July 17, 1929.

The present invention relates to the art of manufacturing pneumatic tires and particularly to the mechanical equipment required for the manufacture of the tire casing. The invention has particularly to do with the construction of tire building forms or drums such as used in the manufacture of the tire casings in "flat" or "pulley band" form.

The invention has as its object the production of a practical and operative drum which is divided on a plane or planes transverse to the axis of the drum, the sections thus produced being capable of telescoping within one another to reduce the overall width of the drum. When the drum is thus reduced in width, the built-up tire casing may be removed by passing one side of the casing over the periphery of the drum until the whole casing can be removed therefrom.

The advantages of a telescopic drum are evident to those skilled in this art as it permits the tire to be removed from the drum without contracting the drum radially. In the ordinary or usual type of drum which is in common use, the drum or form is divided into sectors or segments, one or more of which is movable radially inwardly during the collapsing operation.

The construction of drums of the radially collapsible type is quite expensive and, in addition, the maintenance required to keep these drums in proper working order under the usual factory conditions is high. The form of telescopic drum herein illustrated and described permits substantial improvement over the usual type of drum in original cost and maintenance.

The operations of collapsing the drum, removing the tire and re-erecting the drum are simplified and improved by the invention herein set forth, the operation of the drum being obtained by means of fluid pressure so that the minimum of time and labor is required.

It is a further object of the invention to combine with the drum proper, or those parts of the drum which constitute the tire building surface, a collapsing center or chuck, the two parts being readily separable so that the tire building portion of the drum may be replaced. By this means a single center or chuck may be associated with a variety of sizes and styles of drums, whereby the tire manufacturer may purchase and equip a minimum number of centers or chucks and mount thereon the forming elements required for particular styles or types of tire construction or sizes. The advantages obtainable by this interchangeability will be readily appreciated by those familiar with the practical requirements of this art.

The form of drum illustrated and described herein has the advantage of being readily adjustable and adaptable for the manufacture of tires of varying cross-sectional diameter with common bead diameters. Other advantages and benefits will be recognized as obtainable with the improved telescopic drums, and it will be appreciated and understood that the invention is not necessarily limited to the exact details as illustrated, but changes and modifications may be made therein within the scope of the invention and the appended claims.

In the drawings, in which the preferred form of the invention is shown:

Figure 2 is a similar view showing the drum contracted and illustrating the manner in which the complete tire is removable from the collapsed drum;

Figure 3 is an end view looking at the right hand end of Figure 1;

Figures 1, 6:
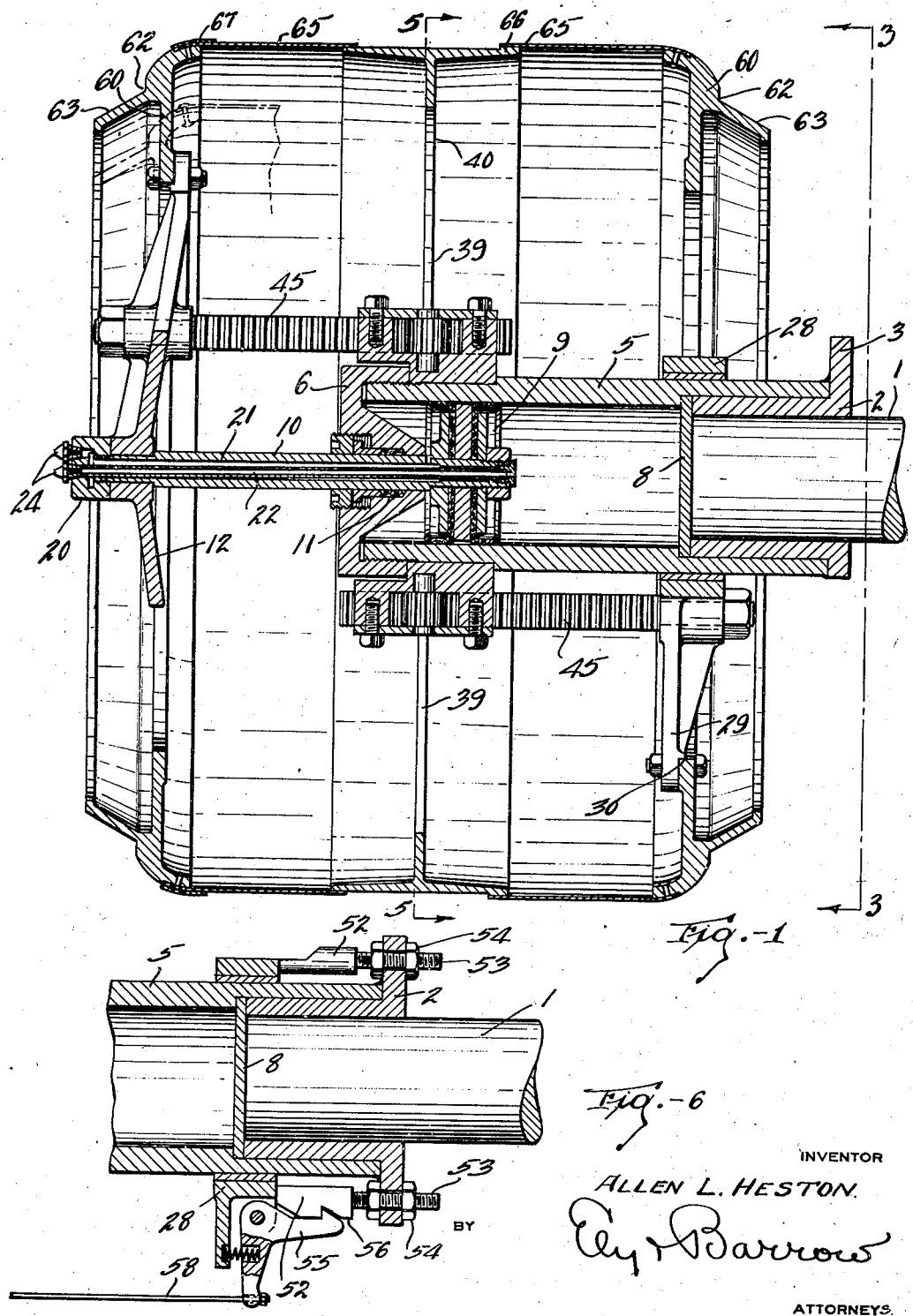
Figure 1 is a longitudinal section along the axis of the improved tire building drum showing the same expanded and in condition to have the tire casing built thereon, the section being taken on the line 1—1 of Figure 3.
Figure 6 is a section on the line 6—6 of Figure 3.
Figure 4:
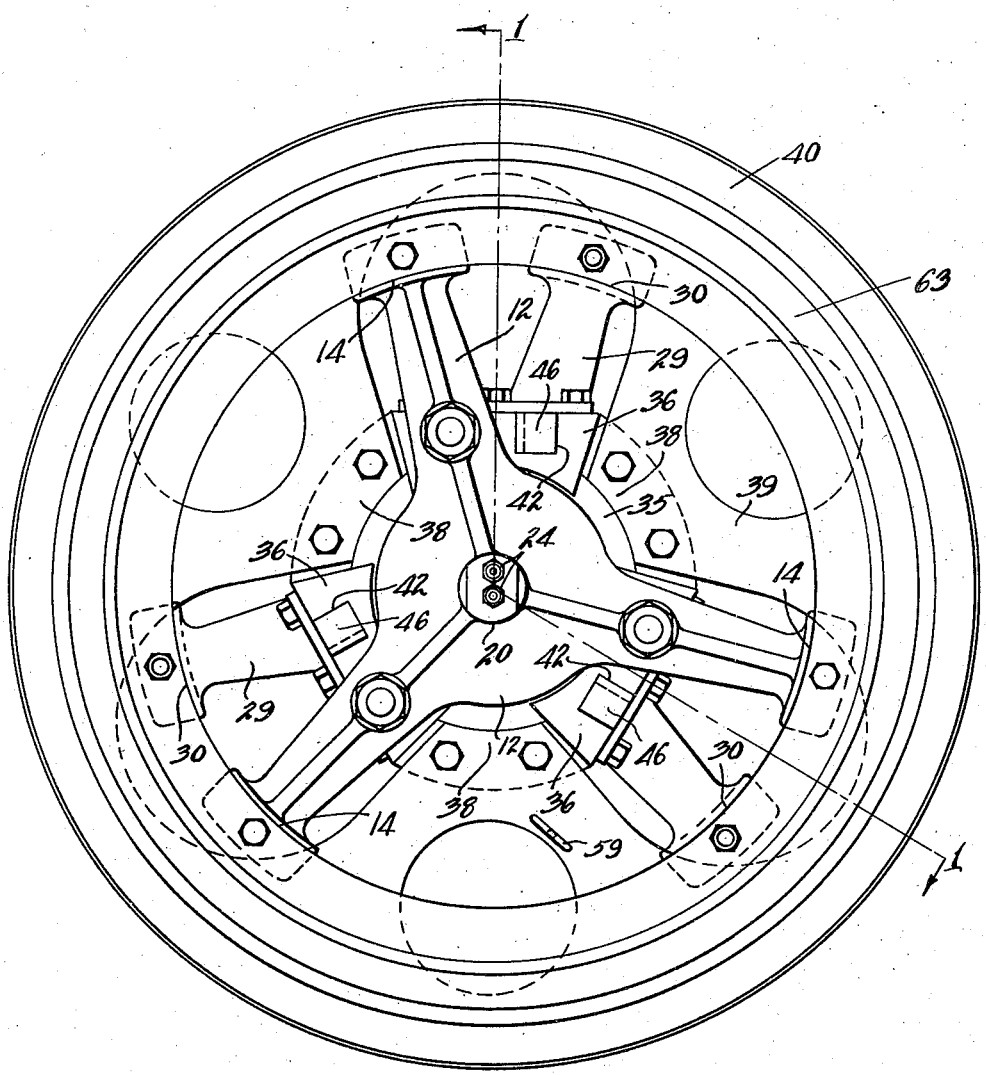
Figure 4 is a similar view, looking at the left hand end of Figure 1.
Figure 5:
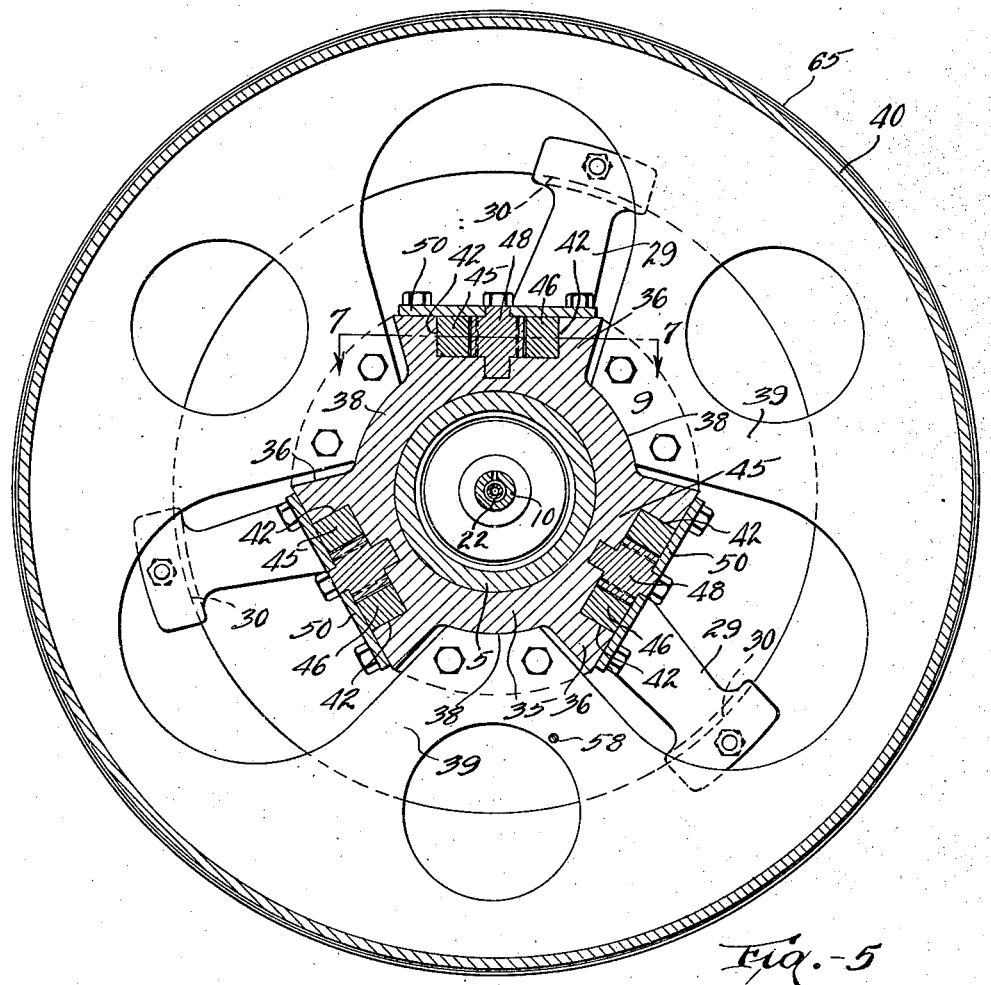
Figure 5 is a section on the line 5—5 of Figure 1.
Figure 7:
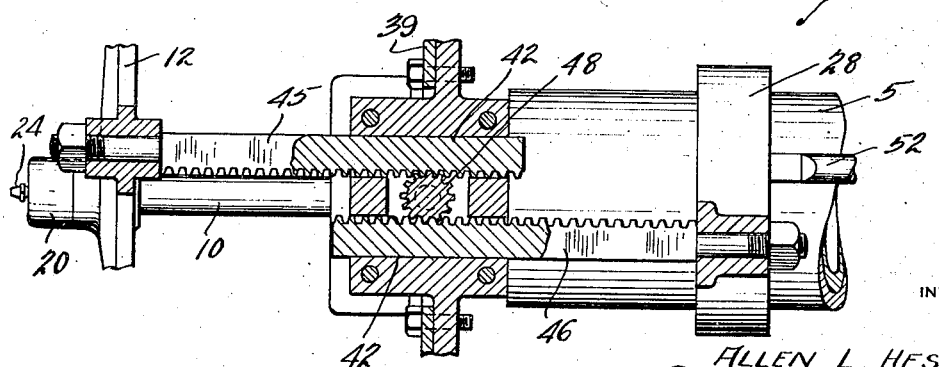
Figure 7 is a section on the line 7—7 of Figure 5.

The drum of tire building form is adapted to be mounted upon the end of a shaft 1 of any of the usual forms of tire building machines or stands, a sleeve 2 having a flange 3 thereon being located over the end of the shaft.

Mounted on the sleeve is the central support in the form of a cylinder 5, the inner end of which abuts the flange, the outer end being closed by a cap 6. A plate 8 across the end of the shaft closes the inner end of that portion of the cylinder in which the drum operating piston 9 is movable.

The piston rod 10 is movable through the cap 6, being sealed by means of the compressible packing 11. On the outer end of the rod is mounted the spider or bracket 12, which is preferably formed with three radiating arms having seats 14 to receive the rings which constitute the edge portions of the drum.

A cap 20 is secured to the outer end of the piston rod, and located within the piston rod is the passage 21 and the tube 22, the former leading to the space at one side of the piston 9 and the other to the opposite side thereof. Nipples 24 on the cap are connected to the passage and the tube respectively, the operator being provided with a gun connected with a source of air under pressure. In collapsing or expanding the drum, the operator inserts the gun at either nipple and admits air under pressure to either side of the piston, depending upon the direction in which the piston is to be moved.

Slidably mounted on the cylinder 5 is a sleeve 28 from which extend the radial arms 29 having seats 30 thereon corresponding to the seats 14 and which are adapted to hold the inner ring of the drum. The arms 29 are equal in number to the arms 12, but are angularly spaced with respect thereto so as to permit of the connection between the arms to be described.

Located on the cylinder at the central plane of the tire building drum is the main casting or supporting sleeve 35, which is formed with the radial housings 36 between which are located the recesses 38 in which are received the inwardly extending webs 39 formed on the central portion of the drum, indicated at 40.

In the outer face of each housing 36 are formed the parallel guideways 42 in which are slidably mounted the oppositely positioned facing racks 45 and 46. These sets of racks, three in number, are attached, respectively, to the arms 12 and 29 and the racks of each pair or set are connected for simultaneous movement by the pinion 48 rotatably mounted in the central casting. A cap plate 50 is secured to the central casting and holds the racks in position.

It will be observed that as the piston is advanced or retracted, the outer set of arms will be moved toward or away from the center of the drum and through the rack and pinion connection, the inner set of arms will be likewise moved.

The extent of outward movement of the arms is determined and limited by means of adjustable or removable stops 52 which are located in the ends of the screw threaded rods 53 received in the flange 3 and held by the nuts 54. A spring latch 55 is carried on the sleeve 28 and is adapted to engage the catch 56 formed on one of the stops, so that the drum is secured in expanded condition. By adjustment of the stops, the width of the drum and therefore the cross sectional diameter of the tire to be built thereon will be adjusted and determined. A rod 58 may be attached to the latch 55, extended forwardly and provided with a handle 59 so that the catch can be operated from the front of the drum.

The adjustment of the drum for different diameters of tires may be accomplished by substituting for the inner and outer rings 60, rings of different widths as shown in dotted lines in Figure 1, and by changing the central portion of the drum 40 to correspond. As shown, the tire building portion of the drum or form, which is thus separable from the operating mechanism or chuck, consists of the two side rings 60 each of which is provided with the tire bead seat 62 and with the outwardly extending apron 63. The ring is curved upwardly as shown and to the outer part thereof is attached the sheet metal extension 65 which extends to and overlaps the central portion of the drum 40. It will be observed that one of the extensions is slightly longer than the other so that their positions may telescope as shown in Figure 2, the portion 40 being provided with the raised edge 66 to compensate therefor. A thin shim 67 may be located on the outer edge of the smaller drum section to compensate for the difference in the outer diameters of the two movable sections of the drum.

It is believed that the operation of the improved telescopic drum will have been apparent from the description which has been given. When the drum is expanded to the extent permitted by the stop 52 as shown in Figure 1, it is ready to receive the various elements which constitute the tire carcass, the beads, which are inextensible, being seated in the recess 62 in the outer rings. After the tire is completed, the operator inserts the gun in the proper nipple and the sets of arms or spiders move inwardly to contracted position, as shown in Figure 2, whereupon the tire may be removed. The adaptability of the collapsing mechanism to the fabrication of varying sizes of tires has been explained in connection with the description of the ring sections of the drum.

It will be seen that an economical and very efficient tire building drum of the telescopic type has been provided, which presents features of improvement in principle and design over the prior forms of drums. The invention is not restricted to exact compliance with the details as shown and described, but they may be varied within the scope of the invention.

What is claimed is:

1. A tire building drum comprising side rings movable toward and from one another, extensions on said rings adapted to form the tire building surface, and a collapsing mechanism located within the drum and separable from the rings.

2. A tire building drum comprising side rings, extensions on said rings, said extensions being adapted to telescope one within the other, and a collapsing mechanism located within the drum and separable from the rings.

3. A tire building drum consisting of side rings and a central ring, extensions on the side rings, adapted to form therewith, a tire building surface, the said extensions and central portion being movable into telescopic relation to permit the removal of a tire therefrom, and a collapsing mechanism located within the drum and separable therefrom.

4. A tire building drum comprising a central support, a pair of slides movable thereover, arms in the slides, seats on the outer ends of the arms, rings having bead seats thereon removably attached to the ends of the arms, and extensions on the rings adapted to form the tire building surface of the drum and arranged to telescope one within the other.

5. A tire building drum comprising a central support, a pair of slides movable over the support, radiating arms on the slides, seats on the outer end of the arms, rings having bead seats thereon and extensions on the rings to constitute tire building surfaces, the rings being removably attached to the ends of the arms, and a central drum section also located in the support but separable therefrom, the extensions and the central drum section being arranged to telescope one within another.

6. A telescopic drum comprising a central support, slides thereon movable toward and from one another in a direction parallel to to the axis of the drum, operative connections between the slides so as to cause the same to move simultaneously, and tire building surfaces carried by the slides, and means to move one of the slides.

7. A telescopic drum comprising a central support, slides movable toward and from one another along the support in a direction parallel to the axis of the drum, racks on the slides, said racks being arranged opposite one another, and an interconnecting pinion between the racks, and tire building surfaces carried by the slides and movable into telescopic position.

8. A telescopic tire building drum comprising a central support, slides movable on the support toward and away from one another, racks attached to the slides and located oppositely to one another, an interconnecting pinion between the racks, fluid pressure means to move one of the slides, and tire building surfaces carried by the slides, said surfaces being adapted to telescope within one another to permit the removal of the tire.

9. A tire building drum comprising a central drum section, rings on opposite sides thereof having bead seats, tire building extensions carried thereon, the said central section and the extensions being adapted to telescope to permit the removal of the tire, slides to support the rings, a cylinder and a piston therein, one of the slides being connected thereto, and mechanical connections between the two said slides to cause joint movement thereof.

10. In a tire building form, the combination of a centrally located cylinder, a piston therein, a ring connected to the piston, a slide movable axially of the cylinder, a second ring supported thereby, extensions upon the rings adapted to form a tire building surface, and mechanical connections between the rings adapted to cause coordinate movement thereof, the said extensions being adapted to telescope one within the other.

11. In a tire building form, the combination of a centrally located cylinder, a piston therein, a ring connected to the piston, a slide movable axially of the cylinder, a second ring supported thereby, a central stationary drum and extensions upon the rings adapted to form a tire building surface, and mechanical connections between the rings adapted to cause coordinate movement thereof, the said extensions being adapted to telescope one within the other.

12. In a tire building form, the combination of a centrally located cylinder, a piston therein, a ring connected to the piston, a slide movable axially of the cylinder, a second ring supported thereby, extensions upon the rings adapted to form a tire building surface, and rack and pinion connections between the rings adapted to cause coordinate movement thereof, the said extensions being adapted to telescope.

13. In a tire building form, the combination of a centrally located cylinder, a piston therein, a ring connected to the piston, a slide movable axially of the cylinder, a second ring suported thereby, extensions upon the rings and a stationary central section adapted to form a tire building surface and rack and pinion connections between the rings adapted to cause coordinate movement thereof, the said extensions and the central section being adapted to telescope.

14. In a tire building form, the combination of a central section and side sections conjointly movable toward and from the central section to vary the width of the tire building surface, and means located at the axis of the form to move the side sections.

15. In a tire building form, the combination of a central section and side sections movable toward and from the central section, the central section and the side sections constituting the tire building surface when the side sections are expanded, and interconnecting means to cause the simultaneous movement of the side sections.

16. In a tire building form, the combination of two oppositely positioned rings having bead seats thereon, extensions upon the rings adapted to form the tire building surface, and interconnecting means to cause movement of the rings toward and from one another.

17. In a tire building form, the combination of two oppositely positioned rings having bead seats thereon, extensions upon the rings adapted to form the tire building surface, racks attached to the rings, and pinions meshing with the racks to impart simultaneous movement to the rings to cause them to move toward and from one another.

18. In a tire building form, the combination of two oppositely positioned rings having bead seats thereon, extensions upon the rings adapted to form the tire building surface, racks attached to the rings, pinions meshing with the racks to impart simultaneous movement to the rings to cause them to move toward and from one another, and fluid operated means to actuate the rings.

19. In a tire building form, the combination of two oppositely positioned rings having bead seats thereon, extensions upon the rings adapted to form the tire building surface, and fluid operated means to cause the rings to move relatively to one another to vary the width between the bead seats.

20. In a tire building form, the combination of two oppositely positioned rings having bead seats thereon, extensions upon the rings adapted to form the tire building surface, and fluid operated means to cause the rings to move simultaneously toward and from one another to vary the width between the bead seats.

21. In a tire building drum, the combination of two oppositely positioned spiders, bead rings attached to the spiders, bead seats located inwardly of the outer surfaces of the rings, extensions upon the rings adapted to form the tire building surface, and separable means for securing the rings upon the spiders.

22. In a tire building drum, a central shaft, oppositely positioned spiders on the shaft, seats on the outer ends of the spiders, rings located in the seats and having bead seats formed thereon, extensions upon the rings to constitute the tire building surface, and means to attach the rings removably to the spiders.

23. In a tire building form, the combination of a central section and side sections conjointly movable toward and from the central section to vary the width of the tire building surface, a rotatable shaft supporting said sections, and means located at the axis of the form to move the side sections, said means operating independently of the rotation of the shaft.

24. In a tire building form, the combination of a central section and side sections movable toward and from the central section, the central section and the side sections constituting the tire building surface when the side sections are expanded, a rotatable shaft supported and adapted to drive said sections, and means interconnecting said sections independently of said shaft for causing concurrent relative movement of the side sections.

25. In a tire building form, the combination of two oppositely positioned rings having bead seats thereon, extensions upon the rings forming the tire building surface, a rotatable shaft supporting and adapted to drive said rings, and interconnecting means operating independently of the shaft for causing movement of the rings toward and from one another.

26. A tire building drum, having a central section, a shaft on which said section is supported in fixed position, two sections on opposite sides thereof, said sections having oppositely positioned extensions and means to move the side sections toward and from the central sections, the extensions overlapping the central section and one another when the drum is contracted.

27. A tire building drum, having a shaft, a central section supported on the shaft in fixed position, two sections on opposite sides thereof, said sections having oppositely positioned extensions, the extensions and the central section forming a surface for the building up of the central portion of the tire casing when the drum is expanded and means to move the side sections toward and from the central sections to contract the drum sufficiently to permit removal of the tire casings from the drum.

28. A tire building drum, having a shaft, a central section supported on the shaft in fixed position, two sections on opposite sides thereof, said sections having oppositely positioned extensions, the extensions and the central section forming a surface for the building up of the central portion of the tire casing when the drum is expanded and means to move the side sections toward and from the central sections to contract the drum sufficiently to permit removal of the tire casing from the drum, the extensions overlapping one another when the drum is contracted.

29. A tire building drum comprising a central section, side rings on opposite sides thereof, said rings being movable toward and from the central section, extensions on the rings which overlap the central section and each other when the rings are moved inwardly, the central section and the extensions constituting the tire building surface when the rings are moved to their expanded limits.

30. A tire building drum comprising a central section, side rings having reduced bead seats and located on opposite sides thereof, said rings being movable toward and from the central section, extensions on the rings which overlap the central section and each other when the rings are moved inwardly, the central section and the extensions constituting the tire building surface when the rings are moved to their expanded limits.

31. A tire building drum comprising a central section, side rings on opposite sides thereof, said rings being movable toward and from the central section, extensions on the rings which overlap the central section and each other when the rings are moved inwardly and adjustable stops to limit the expanding movement of the rings, the central section and the extensions constituting the tire building surface when the rings are moved to their expanded limits.

32. A tire building drum comprising a central section, side rings on opposite sides thereof, extensions on the rings overlapping the central section, means for moving the rings toward and from the central section and adjustable stops to limit the spreading of the side rings.

33. A tire building drum comprising oppositely positioned bead seating flanges, and means for simultaneously moving the flanges in opposite directions.

34. In a tire building form, a main supporting form and adjustable wings upon said form, said wings comprising outer bead seats, and means for causing the simultaneous movement of the wings toward and from the central plane of the form.

35. In a collapsible tire-building drum embodying a plurality of independent peripheral sections, flanges on the sides of said sections, and means for simultaneously moving the flanges of each section in opposite directions.

36. In a collapsible tire-building drum embodying a plurality of independent peripheral sections, flanges on the sides of said sections, means for simultaneously moving the flanges of each section in opposite directions, and means for securing said flanges against axial movement.

ALLEN L. HESTON.